United States Patent [19]

McGuigan et al.

[11] Patent Number: 5,497,613

[45] Date of Patent: Mar. 12, 1996

[54] HOT GAS MANIFOLD SYSTEM FOR A DUAL TOPPING COMBUSTOR GAS TURBINE SYSTEM

[75] Inventors: Arthur W. McGuigan; Benjamin C. Wiant, both of Winter Park, Fla.

[73] Assignee: Westinghouse Electric Corporation, Pittsburgh, Pa.

[21] Appl. No.: 161,026

[22] Filed: Dec. 3, 1993

[51] Int. Cl.⁶ .................................................. F02C 1/00
[52] U.S. Cl. ................................. 60/39.37; 60/731
[58] Field of Search ................. 60/39.37, 39.62, 60/731, 39.23

[56] References Cited

U.S. PATENT DOCUMENTS

| | | | |
|---|---|---|---|
| 2,526,281 | 10/1950 | Ryan et al. | 60/39.37 |
| 2,662,371 | 12/1953 | Rennie et al. | 60/39.37 |
| 2,676,460 | 4/1954 | Brown | 60/39.65 |
| 2,928,242 | 3/1960 | Guenther | 60/39.37 |
| 3,371,480 | 3/1968 | Page et al. | 60/39.37 |
| 3,446,012 | 5/1969 | Foster-Pegg | 60/39.02 |
| 3,446,014 | 5/1969 | Foster-Pegg | 60/39.18 |
| 4,335,573 | 6/1982 | Wright | 60/261 |
| 4,339,925 | 7/1982 | Eggmann et al. | 60/757 |
| 4,369,624 | 1/1983 | Hamm et al. | 60/39.2 |
| 4,387,559 | 6/1983 | Leto | 60/39.32 |
| 4,433,540 | 2/1984 | Cornelius et al. | 60/39.511 |
| 4,573,315 | 3/1986 | Stroem | 60/752 |
| 4,765,146 | 8/1988 | Hellat et al. | |
| 5,161,367 | 11/1992 | Scalzo | 60/39.12 |
| 5,255,506 | 10/1993 | Wilkes et al. | |
| 5,261,226 | 11/1993 | Pillsbury | |

FOREIGN PATENT DOCUMENTS

| | | |
|---|---|---|
| 0193029A1 | 2/1986 | European Pat. Off. |
| 0529310A1 | 7/1992 | European Pat. Off. |
| 0544350A1 | 11/1992 | European Pat. Off. |
| 2358553 | 2/1978 | France |

OTHER PUBLICATIONS

"The Coal–Fired Air Furnace Combined Cycle, Thermodynamic Analysis of an Externally–Fired Gas Turbine Electric Generating Plant," Pittsburgh Energy Technology Center, U.S. Department of Energy (Jul. 1990).

Berman et al., "A High Performance PFB System for Utility Aplication". (No Date).

Cooke et al., "The Production of Coal–Derived Fuel Gas For Powering Gas–Turbines Using Fluidised Bed Techniques", Vienna (1979) CIMAC. (No Month).

Robertson et al., "Second–Generation Pressurized Fluidized Bed Combustion Plant, Conceptual Design And Optimization of a Second–Generation PFB Combustion Plant," pp. 134–159 (Sep. 1989).

Primary Examiner—Timothy S. Thorpe
Attorney, Agent, or Firm—M. G. Panian

[57] ABSTRACT

A hot gas manifold system for a gas turbine power plant utilizing a pressurized fluidized bed combustor producing gas that is heated in two topping combustors. Each topping combustor is connected to a separate manifold. The manifolds, which are adjacent each other in a forward and aft arrangement, are disposed in the turbine shell between the compressor and turbine sections of the gas turbine and each forms a toroidal chamber that encloses the rotor. A plurality of ducts extend downstream from each manifold, with the ducts of the forward manifold extending through the aft manifold. Each of the ducts has an arcuate outlet that together form an annular hot gas path that matches the annular inlet to the turbine section. The ducts from each manifold form an alternating array so the hot gas from each of the individual topping combustors is symmetrically distributed around the turbine inlet.

16 Claims, 4 Drawing Sheets

HOT GAS MANIFOLD SYSTEM FOR A DUAL TOPPING COMBUSTOR GAS TURBINE SYSTEM

BACKGROUND OF THE INVENTION

The present invention relates to a gas turbine system for generating shaft power. More specifically, the present invention relates to a hot gas manifold for a gas turbine system having a plurality of external topping combustors for heating gas from a pressurized fluidized bed combustor ("PFBC").

The high efficiency, low capital cost and short lead time of gas turbine based systems make them particularly attractive to electric utilities as a means for producing electrical power. However, traditionally, gas turbine operation has been limited to expensive, sometimes scare, fuels—chiefly distillate oil and natural gas. As a result of the ready availability and low cost of coal, considerable effort has been expended toward developing a gas turbine system for generating electrical power that can utilize coal as its primary fuel. One area in which these efforts have focused concerns systems in which the combustion of coal is carried out in a pressurized fluidized bed combustor "PFBC."

In one of the simplest gas turbine/PFBC power plant arrangements, ambient air, compressed in the compressor section of the gas turbine, serves to fluidize the bed and provides combustion air for the PFBC. After combustion in the PFBC, the air, now at a high temperature and vitiated by the products of combustion and entrained particulate matter, is exhausted from the PFBC. The air then flows through a cyclone separator wherein much of the particulate matter is removed. The air is then directed to the turbine section of the gas turbine where it is expanded, thereby producing useful shaft power. After expansion, the vitiated air exhausted from the turbine is vented to atmosphere.

The thermodynamic efficiency of such a system is poor, however, due to the need to limit the bed temperature, and hence the temperature of the air entering the turbine section, in order to optimize capture of the sulfur in the coal and avoid carryover of harmful alkali vapors into the turbine section. This is in contrast to modern conventional gas or liquid fuel fired gas turbines, which can operate with turbine inlet gas temperatures as high as 1425° C. (2600° F.). As is well known in the art, increasing the temperature of the gas entering the turbine section increases the power output and efficiency of the gas turbine.

Hence, to achieve maximum efficiency, it has been proposed to employ a separate topping combustor—that is, a combustor external to the gas turbine and the PFBC—to raise the temperature of the air leaving the PFBC to the temperature required for maximum efficiency in the turbine. Although the topping combustor may be fired on oil or natural gas, to maximize coal utilization, the addition of a pyrolysis treatment operation (carbonizer) to the system has been proposed. The carbonizer converts coal to a low BTU gas and a solid, carbonaceous char. The low BTU gas is burned in the topping combustor and the char is burned in the PFBC.

In addition, it may be desirable to utilize more than one topping combustor—for example, in order to allow the gas turbine to remain in operation while one of the topping combustors is being repaired. However, in such situations, the hot gas from the topping combustor(s) remaining in service must be distributed as evenly as possible around the turbine section to avoid creating an asymmetric flow pattern within the turbine section on account of the inoperative topping combustor. Accordingly, it would be desirable to provide a manifold system for distributing hot gas from each of a plurality of topping combustors to the inlet to the turbine section of a gas turbine so that the hot gas from each individual combustor is symmetrically distributed around the turbine inlet.

SUMMARY OF THE INVENTION

Accordingly, it is the general object of the current invention to provide a manifold system for distributing hot gas from each of a plurality of topping combustors to the inlet to the turbine section of a gas turbine so that the hot gas from each individual combustor is symmetrically distributed around the turbine inlet.

Briefly, this object, as well as other objects of the current invention, is accomplished in a gas turbine system comprising (i) a first combustor for burning a fuel in a compressed gas so as to produce a first hot gas flow, (ii) a second combustor for burning a fuel in a compressed gas so as to produce a second hot gas flow, (iii) a turbine having an inlet for receiving the first and second hot gas flows for expansion therein, and (iv) first and second manifolds. The first manifold has (i) means for receiving the first hot gas flow from the first combustor and (ii) means for directing first and second portions of the first hot gas flow to first and second portions of the turbine inlet. The second manifold has (i) means for receiving the second hot gas flow from the second combustor and (ii) means for directing first and second portions of the second hot gas flow to third and fourth portions of the turbine inlet, the third turbine inlet portion being disposed between the first and second turbine inlet portions.

In one embodiment of the invention, the gas turbine further comprises a centrally disposed rotor and a shell enclosing the rotor. The first and second manifolds encircle the rotor and are enclosed by the shell, while the first and second combustors are disposed outside of the shell. In this embodiment, the hot gas directing means of the first manifold comprises first and second ducts for directing the first and second portions of the first hot gas flow to the first and second portions of the turbine inlet, and the hot gas directing means of the second manifold comprises third and fourth ducts for directing the first and second portions of the second hot gas flow to the third and fourth portions of the turbine inlet.

DESCRIPTION OF THE PREFERRED EMBODIMENT

Figure 1:
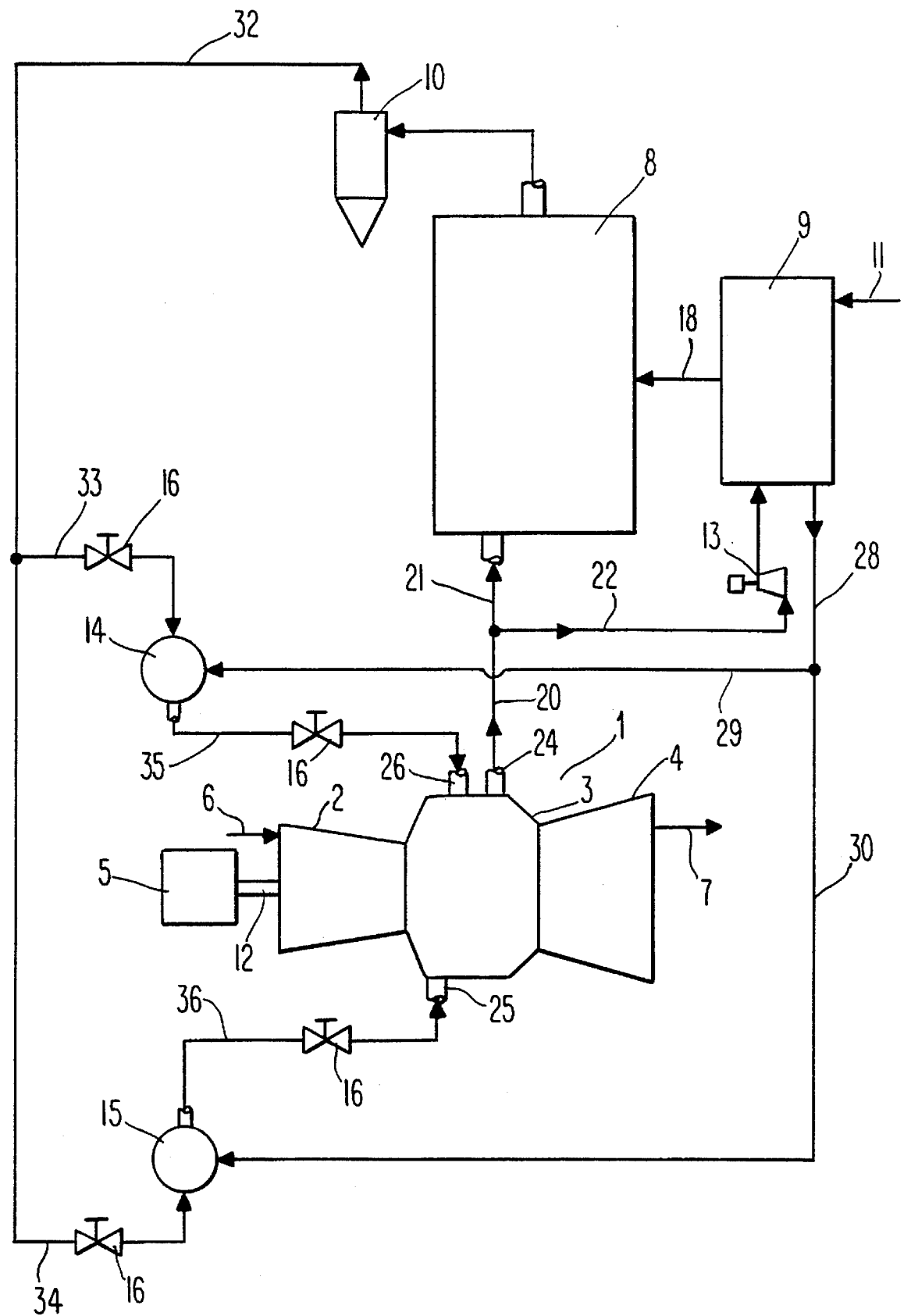
FIG. 1 is a schematic diagram of a gas turbine system according to the current invention using a PFBC, dual topping combustors and the hot gas manifold system of the current invention.

Referring to the drawings, there is shown in FIG. 1 a solid fuel gas turbine system. An oxygen-bearing gas 6, such as ambient air, enters the compressor section 2 of a gas turbine 1 and is compressed. A major portion 21 of the compressed air 20 produced by the compressor 2 is directed to a pressurized fluidized bed combustor ("PFBC") 8. The PFBC 8 consumes a solid fuel 18, which may be a char produced by a carbonizer 9, as discussed further below. The PFBC 8 comprises a combustion chamber in which the solid fuel is maintained in a pressurized fluidized bed to promote combustion. The compressed air 21 fluidizes the bed and supplies the oxygen necessary for combustion of the solid fuel. As a result of the combustion of the fluidized solid fuel in the compressed air, the PFBC 8 produces a hot compressed gas 32.

As previously discussed, in order to optimize capture of the sulfur in the solid fuel and avoid carryover of harmful alkali vapors into the turbine section 4, the temperature of the gas 32 produced by the PFBC 8 is limited. However, the power produced by a gas turbine 1 is proportional to the temperature drop across its turbine section 4, so that the higher the temperature of the gas entering the turbine, the greater the power produced. Therefore, according to an important aspect of the current invention, the hot gas 32 produced by the PFBC 8, now vitiated by the combustion products, is directed to a cyclone separator 10 and then to two external topping combustors 14 and 15. (As used herein, the term "external" means external to the gas turbine shell 40, shown in FIG. 2.) The external topping combustors 14 and 15 are supplied with gaseous fuel from the carbonizer 9.

As shown in FIG. 1, the carbonizer 9 is supplied with coal 11 that it converts to a carbonaceous char 18 and a hydrocarbon-based gas 28, typically a low BTU gas, using a pyrolysis process. In addition to coal 11, the carbonizer 9 requires a supply of high pressure oxygen. Such oxygen is obtained by bleeding a portion 22 of the air 20 discharged from the compressor section 2 to a boost compressor 13 and thence to the carbonizer 9. The low BTU gaseous fuel 28 produced by the carbonizer 9 is divided into two streams 29 and 30 that are directed to the topping combustors 14 and 15, respectively, where the fuel is burned in the hot gas 32, thereby further increasing its temperature. Sufficient gas fuel 29 and 30 is burned in the topping combustors 14 and 15 so that the gas streams 35 and 36 discharging from them are heated to the required temperature for the desired output of the turbine.

The high temperature gas streams 35 and 36 from the topping combustors 14 and 15 are then directed to the turbine section 4 of the gas turbine 1, using the manifold system of the current invention, as discussed further below. In the turbine section 4, the hot gas streams 35 and 36 are expanded, thereby producing sufficient power in the gas turbine rotor 12 to drive an electric generator 5. The expanded gas 7 is then discharged to atmosphere or a heat recovery steam generator (not shown).

Figure 2:
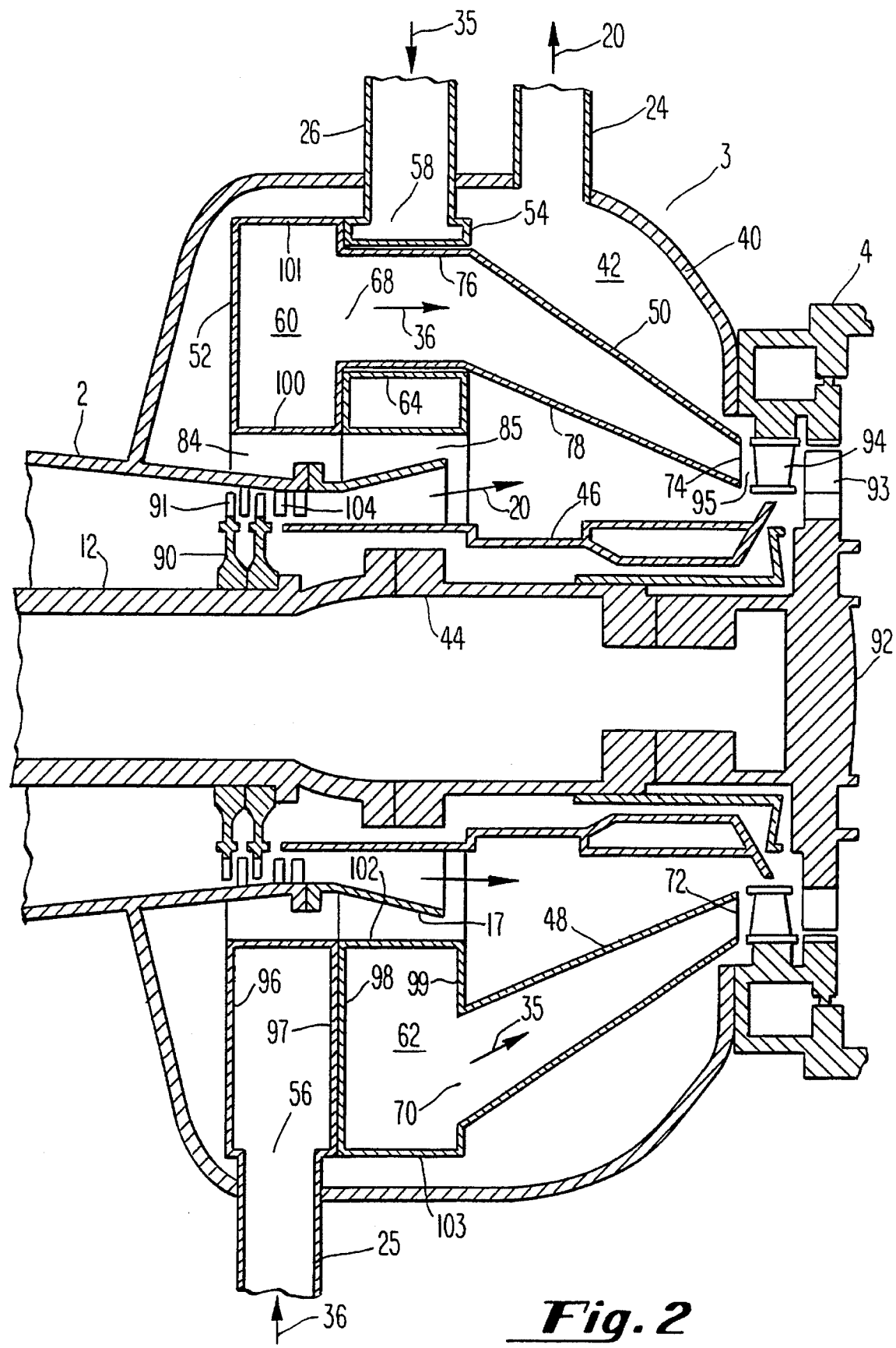
FIG. 2 is a longitudinal cross-section through a portion of the gas turbine shown in FIG. 1 in the vicinity of the hot gas manifold system.

FIG. 2 shows a cross-section through a portion of the gas turbine 1 shown in FIG. 1. As shown in FIG. 2, an approximately cylindrical casing 40 encloses a center section 3 of the gas turbine 1 located between the compressor section 2 and turbine section 4. The compressor section 2 is comprised of a portion of the rotor 12, around which a plurality of discs 90 and rotating blades 91 are circumferentially arrayed in rows. In addition, the compressor comprises a plurality of stationary vanes 104 arranged in circumferentially extending rows between each row of rotating blades 91. The compressor inducts ambient air 6 at its inlet end and discharges compressed air 20 through a conical shaped diffuser 17 at its outlet end.

The compressed air 20 discharged from the compressor section 2 flows into an annular chamber 42 formed by the gas turbine shell 40. The chamber 42 surrounds a portion of the rotor 12—referred to as the torque tube—which connects the compressor portion of the rotor to the turbine portion of the rotor, thereby enabling the compressor 2 to be driven by the power produced in the turbine section 4. A cylindrical housing 46 separates the rotor 12 from the chamber 42.

A pipe 24 is connected to the shell 40 so as to place the chamber 42 in air flow communication with the PFBC 8 and the carbonizer 9, thereby causing the compressed air 20 to exit the chamber 42. After being heated in the PFBC 8 and the topping combustors 14 and 15, the portion 21 of the air 20 that was directed to the PFBC 8 is returned to the chamber 42 in the form of hot gas streams 35 and 36. As shown in FIG. 2, the hot gas streams 35 and 36 are directed to the chamber 42 by pipes 25 and 26 that extend through the shell 40.

Pipe 26 directs the hot gas stream 35 from topping combustor 14 to an inlet 58 formed in an aft manifold 54. Pipe 25 directs the hot gas stream 36 from topping combustor 15 to an inlet 56 in a forward manifold 52, the forward manifold 52 being disposed axially upstream of the aft manifold 54. As shown in FIG. 2, the manifolds 52 and 54 are disposed in the chamber 42 so as to be enclosed by the shell 40.

The forward manifold 52 is formed by forward and aft radially extending circular end walls 96 and 97, respectively, and concentric inner and outer cylindrical walls 100 and 101, respectively, thereby creating a toroidal chamber 60. The aft manifold 54 is formed by forward and aft radially extending circular end walls 98 and 99, respectively, and concentric inner and outer cylindrical walls 102 and 103, respectively, thereby creating a toroidal chamber 62. The manifolds 52 and 54 have centrally disposed holes 84 and 85, respectively, that allow them to encircle the compressor diffuser 17 and the rotor 12.

Figure 3:
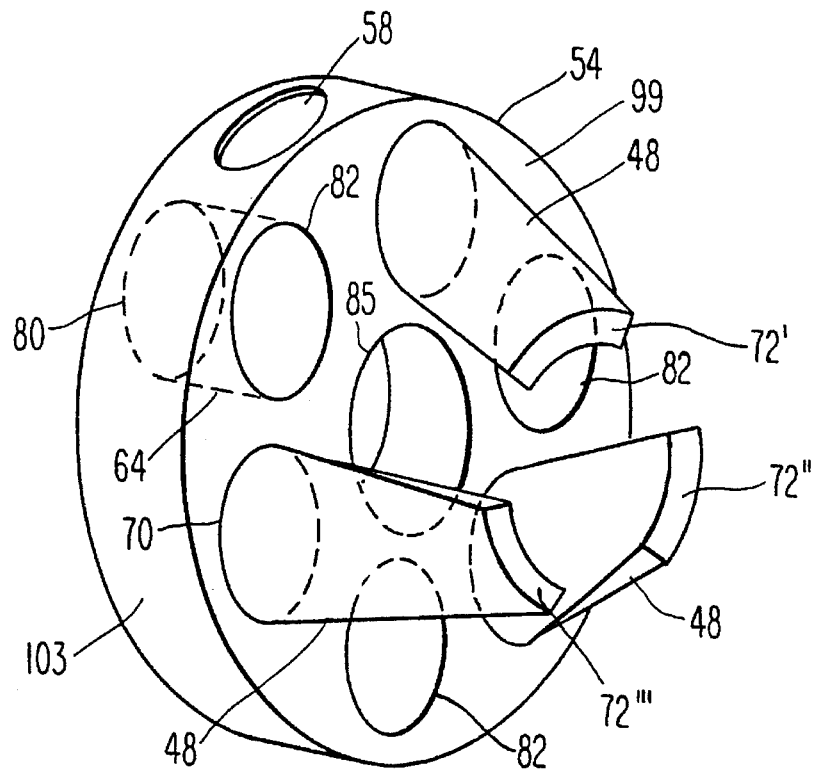
FIG. 3 is an isometric view of the aft hot gas manifold shown in FIG. 2.

As shown in FIG. 3, the aft manifold 54 has three substantially axially oriented ducts 48 extending from openings 70 formed in its aft end wall 99. (Although the current invention is described with reference to three ducts for each manifold, the invention is equally applicable for use with a greater or lesser number of ducts.) The openings 70 form inlets for the ducts 48 that place them in flow communication with the toroidal chamber 62 and are uniformly spaced around a circle. Thus, the aft manifold 54 distributes the hot gas stream 35 that it receives from the first topping combustor 14 into three portions, one for each of the ducts 48. Three additional openings 82 are formed in the aft end wall 99 and are uniformly spaced around the same circle as the three duct inlets 70. In addition, three openings 80 are formed in the forward end wall 98 and are axially aligned with the holes 82 in the aft end wall 99. Each pair of holes 80 and 82 is connected by an axially oriented sleeve 64 that extends between the forward and aft end walls 98 and 99.

Each of the ducts 48 has an arcuate outlet port 72 formed at its aft end. The ducts 48 are shaped so as to make the transition from the circular inlet ports 70 to the arcuate outlet ports 72. The outlet ports 72 are uniformly space around a circle of somewhat smaller diameter than the circle around which the duct inlets 70 are spaced, so that the ducts 48 extend radially inward somewhat as they extend axially rearward, as shown best in FIG. 2.

Figure 4:
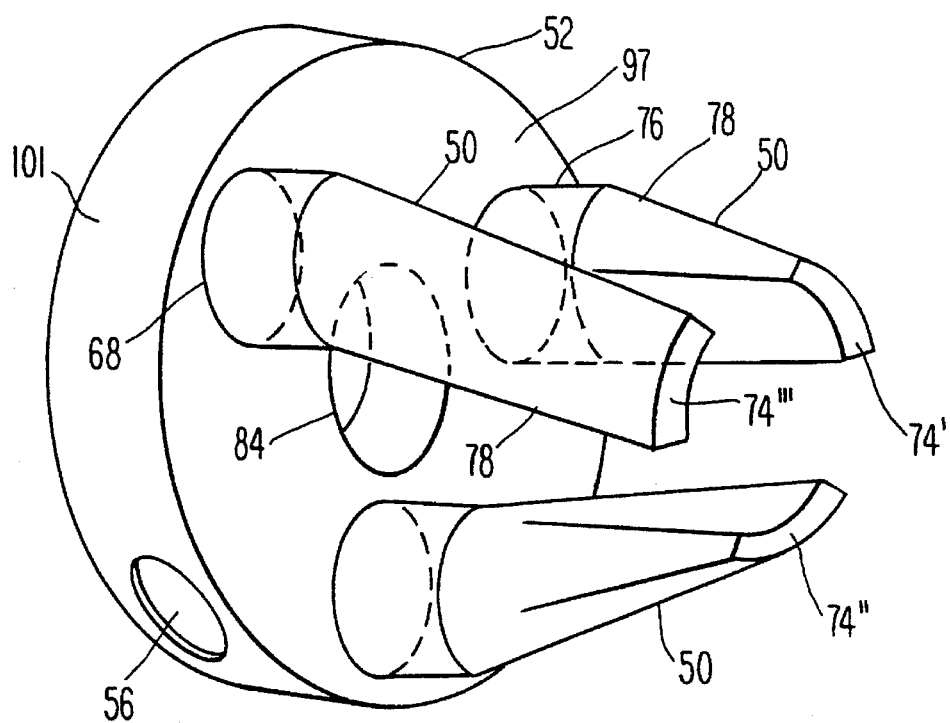
FIG. 4 is an isometric view of the forward hot gas manifold shown in FIG. 2.

As shown in FIG. 4, the forward manifold 52 has three substantially axially oriented ducts 50 extending from openings 68 formed in its aft end wall 97. The openings 68 form inlets for the ducts 50 that place them in flow communication with the toroidal chamber 60 and are uniformly spaced around a circle having the same diameter as, and concentric with, the circle around which the duct inlet ports 70 of the aft manifold 54 are spaced. Thus, the forward manifold 54 distributes the hot gas stream 36 that it receives from the second topping combustor 15 into three portions, one for each of the ducts 50.

Each of the forward manifold ducts 50 has an arcuate outlet port 74 formed at its aft end. The outlet ports 74 are uniformly space around a circle having the same diameter as, and concentric with, the circle around which the outlet ports 72 of the aft manifold are spaced, so that the ducts 50 likewise extend radially inward somewhat as they extend axially rearward. The ducts 50 each have an upstream cylindrical portion 76 and a downstream portion 78 that, like the ducts 48, is shaped so as to make the transition from the cylindrical portion 76 to the arcuate outlet port 74.

Figure 5:
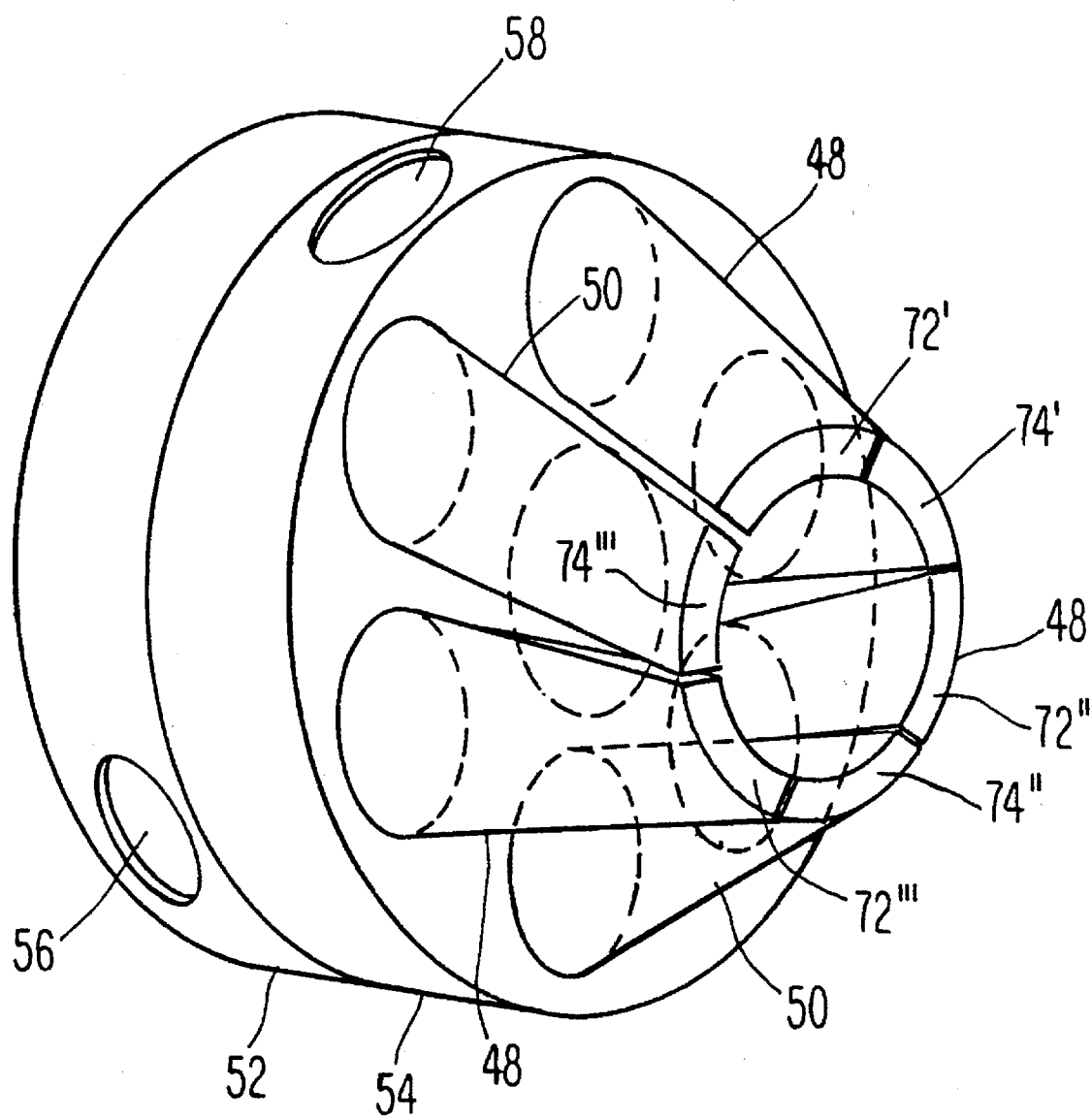
FIG. 5 is an isometric view of the forward and aft manifolds shown in FIGS. 3 and 4 assembled together.

As shown in FIG. 5, the manifolds 52 and 54 are joined into an assembly so that the upstream portions 76 of the ducts 50 of the forward manifold 52 extend through the sleeves 64 in the aft manifold 54. As a result of the structure discussed above, the ducts 48 and 50 are arranged in a circular alternating array around the rotor 12, with each duct being disposed between two adjacent ducts from the other manifold. Also, the lengths of the ducts 48 and 50 are such that the all of the duct outlets 72 and 74 lie in a common radially extending plane and, when combined, form an annular discharge path for the hot gas steams 35 and 36.

As shown in FIG. 2, the annular discharge path formed by the duct outlets 72 and 74 matches the shape and size of the annular inlet 95 of the turbine section 4 and is located so as to direct the hot gas streams 35 and 36 directly into the turbine inlet 95. Thus, each of the duct outlets 72', 72", 72'", 74', 74" and 74'" direct the hot gas to the portion of the turbine inlet 95 that is immediately downstream of it. Once it has entered the turbine section 4, the hot gas streams 35 and 36 are expanded and cooled by flowing over stationary vanes 94 and rotating blades 93, which extend from the periphery of a disc 92, thereby generating power in the rotor 12.

When the manifolds 52 and 54 are assembled, as shown in FIG. 5, the ducts 48 and 50 are intermingled so as to alternate in the circumferential direction. As a result, the first forward manifold duct outlet 74' is located between the first and second aft manifold duct outlets 72' and 72', the second forward manifold duct outlet 74" is located between the second and third aft manifold duct outlet outlets 72" and 72'", and the third forward manifold duct outlet 74'" is located between first and third aft manifold duct outlets 72' and 72'".

Similarly, the portion of the turbine inlet 95 to which the first forward manifold duct outlet 74' directs its hot gas flow is located between the portions of the turbine inlet to which the first and second aft manifold duct outlets 72' and 72" direct their hot gas flow, the portion of the turbine inlet 95 to which the second forward manifold duct outlet 74" directs its hot gas flow is located between the portions of the turbine inlet to which the second and third aft manifold duct outlets 72" and 72'" direct their hot gas flow, and the portion of the turbine inlet 95 to which the third forward manifold duct outlet 74'" directs its hot gas flow is located between the portions of the turbine inlet to which first and third aft manifold duct outlets 72' and 72'" direct their hot gas flow.

Thus, according to an important aspect of the current invention, the duct outlets 72 of the aft manifold 54 and the duct outlets 74 of the forward manifold 52 are each symmetrically arranged around the rotor 12 independently of the other manifold so that each of the hot gas streams 35 and 36 is individually symmetrically distributed around the turbine inlet 95. Accordingly, in the event that one of the topping combustors 14 or 15 is taken out of service and isolated from the system by valves 16, shown in FIG. 1, the hot gas stream 35 or 36, as the case may be, from the other topping combustor will still be symmetrically distributed around the turbine inlet 95, thereby precluding harmful distortions in the hot gas flow through the turbine section 4.

Although the present invention has been illustrated with respect to two topping combustors for a PFBC based gas turbine system, the invention is also applicable to systems using a greater number of topping combustors or to systems using multiple combustors in other applications. According, the present invention may be embodied in other specific forms without departing from the spirit or essential attributes thereof and, accordingly, reference should be made to the appended claims, rather than to the foregoing specification, as indicating the scope of the invention.

We claim:

1. A gas turbine system, comprising:
    a) a first combustor for burning a fuel in a compressed gas so as to produce a first hot gas flow;
    b) a second combustor for burning a fuel in a compressed gas so as to produce a second hot gas flow;
    c) a turbine having an inlet for receiving said first and second hot gas flows for expansion therein;
    d) a first manifold having (i) means for receiving said first hot gas flow from said first combustor and (ii) means for directing first and second portions of said first hot gas flow to first and second outlet ports, said first and second outlet ports in flow communication with first and second portions of said turbine inlet;
    e) a second manifold having (i) means for receiving said second hot gas flow from said second combustor and (ii) means for directing first and second portions of said second hot gas flow to third and fourth outlet ports, said third and fourth outlet ports in flow communication with third and fourth portions of said turbine inlet, said third outlet port being disposed between said first and second outlet ports; and
    f) wherein each of said first and second manifolds forms a toroidal chamber, said means for directing first and second portions of said second hot gas flow of said first manifold comprises first and second ducts connected to said toroidal chamber of said first manifold, and means for directing first and second portions of said second hot gas flow of said second manifold comprises third and fourth ducts connected to said toroidal chamber of said second manifold.

2. The gas turbine system according to claim 1, wherein said gas turbine further comprises a centrally disposed rotor, and wherein said first and second manifolds encircle said rotor.

3. The gas turbine system according to claim 2, wherein said gas turbine further comprises a shell enclosing said rotor, said first and second manifolds being disposed within said shell.

4. The gas turbine system according to claim 3, wherein said first and second combustors are disposed outside of said shell.

5. The gas turbine system according to claim 1, wherein:
    a) said turbine inlet is substantially annular;
    b) said first, second, third and fourth outlet ports are arranged in a circumferential array and lie in a common radially extending plane; and c) said second outlet port is disposed between said third and fourth outlet ports.

6. The gas turbine system according to claim 5, wherein:

a) said hot gas directing means of said first manifold has means for directing a third portion of said first hot gas flow to a fifth outlet port in flow communication with a fifth portion of said turbine inlet;

b) said hot gas directing means of said second manifold has means for directing a third portion of said second hot gas flow to a sixth outlet port in flow communication with a sixth portion of said turbine inlet;

c) said fifth outlet port is dispose between said fourth and sixth outlet ports; and c) said sixth outlet port is dispose between said first and fifth outlet ports.

7. The gas turbine system according to claim 1, wherein said first and second ducts extend in the axial direction from said first manifold, and wherein said third and fourth ducts extend in the axial direction from said second manifold.

8. The gas turbine system according to claim 7, wherein said first manifold is disposed axially upstream from said second manifold.

9. The gas turbine system according to claim 8, wherein said first and second ducts extend through said second manifold.

10. The gas turbine system according to claim 1, wherein said first, second, third and fourth ducts are arranged in a circumferential array.

11. The gas turbine system according to claim 1, wherein each of said outlet ports is formed in one of said ducts, each of said outlet ports being arcuate.

12. The gas turbine system according to claim 1, further comprising:

a) a third combustor having a pressured fluidized bed for burning a solid fuel so as to produce a compressed gas; and b) means for directing said compressed gas from said third combustor to said first and second combustors.

13. A gas turbine system, comprising:

a) a rotor;

b) a plurality of combustors for producing a hot gas;

c) a turbine section for expanding said hot gas; and d) means for distributing said hot gas rom each of said combustors to said turbine section, said hot gas distributing means comprising a manifold for each of said combustors, each of said manifolds comprising a toroidal chamber encircling said rotor and having a plurality of ducts extending therefrom, each of said ducts having an outlet port formed therein, said duct outlet ports arranged around said rotor in a circumferential array, said duct outlet ports for each of said manifolds being interspersed around said array so that a duct outlet port from each of said manifolds is disposed adjacent to a duct outlet port from another one of said manifolds.

14. The gas turbine system according to claim 13, further comprising:

a) a compressor section;

b) a shell enclosing said rotor and forming a chamber in flow communication with said compressor section, each of said manifolds disposed in said chamber.

15. A gas turbine system, comprising:

a) a rotor;

b) a plurality of combustors for producing a hot gas;

c) a turbine section for expanding said hot gas; and d) means for distributing said hot gas from each of said combustors to said turbine section, said hot gas distributing means comprising a manifold for each of said combustors, said manifolds being axially displaced from one another, each of said manifolds having a plurality of ducts extending therefrom, each of said ducts having an outlet port formed therein, said duct outlet ports arranged around said rotor in a circumferential array, said duct outlet ports for each of said manifolds being interspersed around said array so that a duct outlet port from each of said manifolds is disposed adjacent to a duct outlet port from another one of said manifolds.

16. The gas turbine system according to claim 15, further comprising:

a) a compressor section;

b) a shell enclosing said rotor and forming a chamber in flow communication with said compressor section, each of said manifolds disposed in said chamber.

* * * * *

UNITED STATES PATENT AND TRADEMARK OFFICE
CERTIFICATE OF CORRECTION

PATENT NO. :   5,497,613

DATED       :   March 12, 1996

INVENTOR(S) :   ARTHUR W. McGUIGAN et al.

It is certified that error appears in the above-identified patent and that said Letters Patent is hereby corrected as shown below:

Column 1, after the title, and before the Background of the Invention, insert the following as a new paragraph:

-- Government Interest

This invention was made with government support under Contract DE-AC21-86M23167, awarded by the Department of Energy. The government has certain rights in this invention. --

Signed and Sealed this

Seventh Day of March, 2000

*Attest:*

*Attesting Officer*

Q. TODD DICKINSON

*Commissioner of Patents and Trademarks*